Jan. 3, 1967  F. D. HICKEY ETAL  3,295,982
CONTINUOUS RENDERING METHOD AND APPARATUS
Filed July 23, 1962
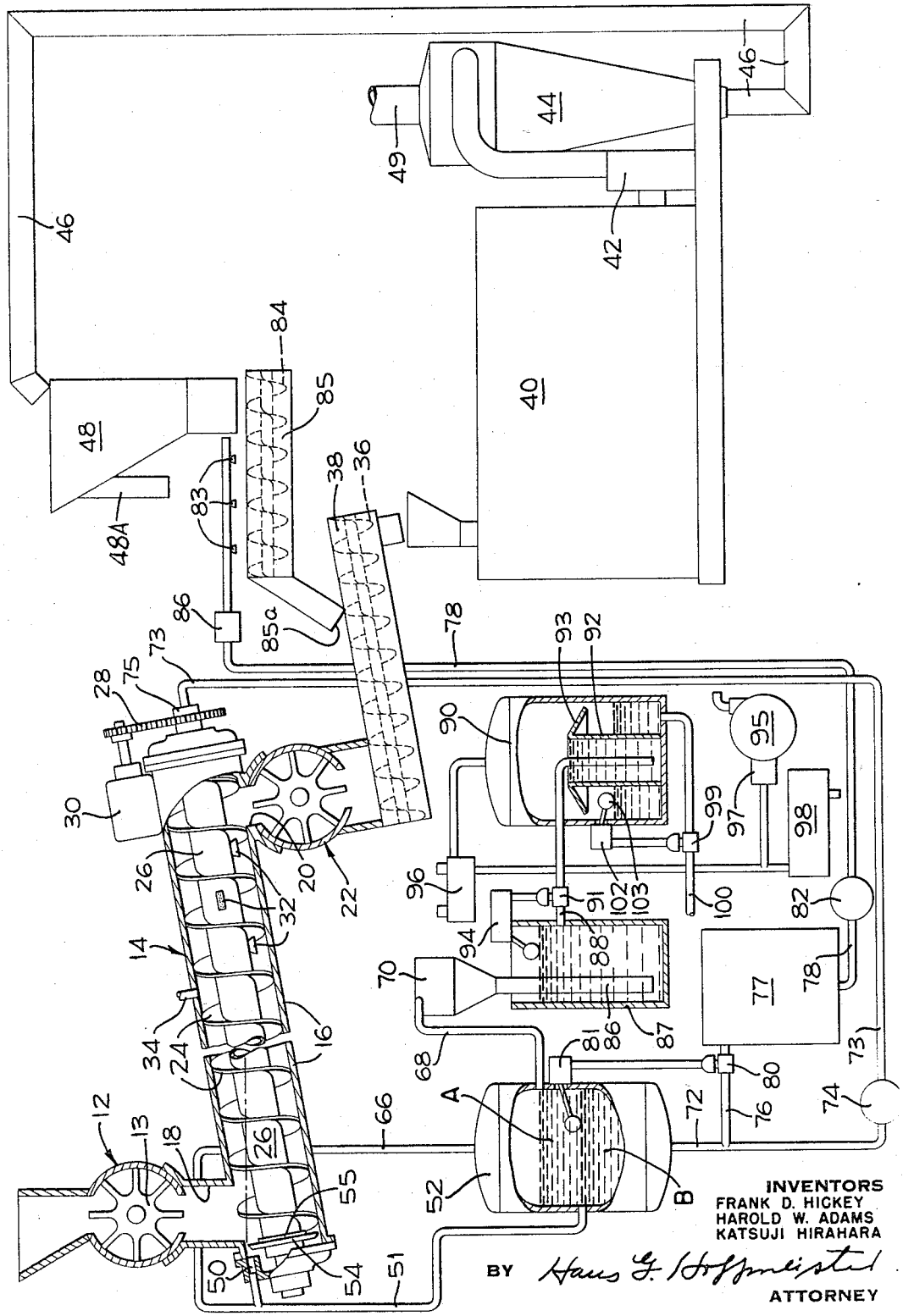
INVENTORS
FRANK D. HICKEY
HAROLD W. ADAMS
KATSUJI HIRAHARA
BY Hans G. Hoffmeister
ATTORNEY

3,295,982
CONTINUOUS RENDERING METHOD AND APPARATUS

Frank D. Hickey, Harold W. Adams, and Katsuji Hirahara, San Jose, Calif., assignors to FMC Corporation, San Jose, Calif., a corporation of Delaware
Filed July 23, 1962, Ser. No. 211,761
22 Claims. (Cl. 99—2)

This invention relates to a method of recovering tallow and high protein meal from fat-containing solids such as animal fats, meat scrap, offal and slaughter house wastes, and to an improved apparatus for carrying out the method.

In one well-known commercial rendering process, a charge of fat-containing waste material is cooked for several hours to release tallow and grease in liquid form. The cooked materials are then moved to a position over a grate or screen to permit the free fat to drain from the solids. After the free fat has drained, the solids are conveyed to presses where most of the remaining fat is expressed to produce dry cakes of meal. The hot pressed cake is cooled and finally broken up and ground to prepare the meal for shipment. The free fat that is drained from the solids is allowed to stand in a settling tank for a predetermined time, and then it is centrifuged. From the centrifuge, the tallow is directed to a large open tank where it is treated chemically to precipitate our fines and impurities. Finally, the tallow is moved to an open cooking vessel where the temperature is raised to about 220° F. to remove moisture, after which the tallow is taken to a storage container. It is evident that this conventional rendering process is inefficient since it requires several hours to process a batch of material and involves much hand labor. Further, the tallow produced by this process is not of the highest quality.

It is therefore an object of the present invention to provide an improved process for recovering tallow and high protein meal from fat-containing slaughter house wastes and the like.

Another object is to provide a rendering process which may be carried on as a continuous operation during which the raw material is completely processed during an interval of from 10 to 30 minutes.

Another object is to provide a rendering process that will produce a low fat high protein meal and a tallow that is substantially water-free and has a relative light, clear appearance.

Another object is to provide, in a rendering process, an improved method of stripping fat from the meal.

Another object is to provide, in a rendering process, an improved method of increasing the protein content of the meal produced in the process.

Another object is to provide an efficient rendering system.

Another object is to provide a simple, effective mechanism for removing moisture from tallow.

Another object is to provide a device for stripping fat from meal being processed in a rendering system.

Another object is to provide to an improved device for adding protein to meal produced in a rendering process.

Other and further objects and advantages of the present invention will become apparent from the following description taken in connection with the drawing which is a schematic illustration of the rendering system of the present invention.

In the present rendering system, meat scraps, offal and the like is discharged into a supply hopper (not shown) from a steam-heated screw conveyor (not shown) which carries the raw material from a previous processing station at which the material is heated and subjected to the action of a hammermill or other device which reduces the size of the material so that the majority of the pieces have a maximum dimension of about 1 inch. The raw material passes through a pressure valve 12 and into the lower end of a continuous pressure vessel 14 which is inclined at about 10° to the horizontal. The valve 12 may be of the type disclosed in the U.S. Letters Patent to William de Back, No. 2,638,137. In general, this valve includes a rotor 13 having pockets which move the solid material into the vessel 14 with a minimum amount of loss of pressure from the vessel 14.

The continuous pressure vessel 14 may be of the type disclosed in the U.S. patent application of Frank D. Hickey, Serial No. 17,918, now abandoned, which is assigned to the assignee of the present application. The cooker comprises a cylindrical housing 16 having an upwardly projecting inlet conduit 18 at its lower end, and a downwardly directed discharge opening 20 at its upper end, said discharge opening 20 being arranged to direct material into a pressure valve 22 which is substantially indentical to pressure valve 12. A helical conveyor element 24, which is disposed inside the housing 16, is formed around a tubular shaft 26 that is journalled for rotation in the housing 16. The shaft 26 is hollow and is arranged to be continuously driven through a chain and sprocket drive 28 from a motor 30. A plurality of spray nozzles 32 are mounted on the tubular shaft 26, each nozzle communicating with the interior of the shaft to receive liquid which is delivered to the interior of the shaft through the upper end thereof, in a manner to be described presently. Steam is directed into the cooker through one or more inlet ports 34 to heat the material being cooked. The steam is introduced into the housing at a pressure in the range of from 50 to 120 p.s.i.g. and accordingly, the temperature of the interior of the cooker and of the material being cooked in the range of from 300 to 350° F.

The main cooking action takes place in the lower end of the vessel in a zone which occupies about ⅓ of the space enclosed by the housing 16. As the material is cooked, it is continuously agitated by the screw 24 and it becomes separated into two components, a portion consisting of solid material, hereinafter referred to as meal, and a portion consisting of a mixture of liquid and fat. The screw advances the meal upwardly away from the pool of cooking material to the upper end of the vessel where it is discharged through the pressure valve 22 into the lower end of an upwardly inclined, screw conveyor 36 which operates in an open-top trough 38 and discharges the meal into a rotary drier 40. The drier may be of the three-pass direct-fired type having a gas-burning heater adjacent the inlet end and three concentric rotating drums mounted on trunnions. Meal from conveyor 36 is discharged into the interior drum and successively passes through the three drums until it is discharged into a rotary blower 42 which draws the heated air and the meal through the drums and discharges the meal tangentially into the upper end of a cyclone unit 44. In the cyclone, the meal works its way downwardly to the lower end of the cyclone where it is discharged into the inlet end of a conveyor system 46 which elevates the meal and delivers it to a storage hopper 48. The conveyor system may consist of a screw type conveyor arrangement, an endless bucket system, or any suitable combination of commercial conveyor units. The hopper 48 is provided with a conventional overflow pipe 48A.

Moist air and entrained fines work their way to the central portion of the cyclone 44 and are discharged upwardly through a conduit 49 to atmosphere. When the meal leaves the cyclone, it has about 8 percent moisture.

While the meal is being moved upwardly in the cooker, the combined fat and liquid protein portion of the material in the cooker accumulates in the pool at the lower end of the pressure vessel 14 with a floating layer of liquid fat. An opening 50 is provided in the vessel so that the fat can drain continuously out of the pressure vessel 14. A disc 54 is removably secured, as by bolts not shown, to a flange 55 which is fixed to and projects outwardly from the shaft 26 adjacent its lower end. The diameter of the disc is such that a clearance of approximately ³⁄₁₆" is provided between the periphery of the disc and the inner surface of the cylindrical housing 16. The clearance space at the upper edge of the disc forms a self-cleaning orifice through which the fat and proteinaceous liquid can pass. It will be evident that, if meat fragments or the like become lodged in this orifice, they will be carried downwardly as the disc rotates with the shaft 26. The disc should, of course, be located a sufficient distance away from the inlet opening 18 of the cooker so that material entering the cooker will not be immediately moved into the orifice.

The fat that passes through opening 50 is directed through a conduit 51 to a decanter 52 in which the fat separates into a relatively light upper portion A of fat or tallow and a relatively heavy lower portion B of aqueous protein which will be referred to hereinafter as stickwater. The decanter 52 is described and claimed in the application for U.S. Letters Patent of Katsuji Hirahara, Ser. No. 203,121, now U.S. Patent 3,211,535, which is assigned to the asignee of the present application, and reference may be had to that application for a complete disclosure of any details not specifically mentioned hereinafter.

An equalizing conduit 66 establishes communication between the interior of the decanter 52 and the interior of the cooker 14 on the downstream side of the filtering disc 54, said conduit 66 being connected to conduit 51 adjacent the lower end of the cooker. It will be noted that, if the orifice defined by disc 54 and the housing 16 becomes clogged, conduit 66 will be cut off from the interior of the cooker and the pressure on the downstream side of disc 54 will drop. The pressure differential thus created will have a tendency to push the clogging material past the disc, the periphery of which is relieved on its downstream side by a bevel. Accordingly, the interior of the upper end of the decanter 52 is subjected to a steam atmosphere at a pressure in the range of 50 to 120 p.s.i.g., and the tallow in portion A is discharged through a conduit 68 to a cyclone unit 70 which is, in general, identical to the previously mentioned cyclone 44. Stickwater is removed from the decanter through an opening in the lower end which communicates with a conduit 72. A pump 74 forces liquid from conduit 72 to a conduit 73 which directs liquid into a reduced diameter tubular end portion 75 of the tubular shaft 26 of the cooker 14. Since the shaft 26 rotates and the conduit 73 is stationary, a swivel pipe joint must be provided between the shaft 26 and conduit 73. A suitable joint is disclosed in the Allen et al. Patent 2,330,197. As previously mentioned, the stickwater is pumped into the tubular shaft 26 and is discharged therefrom through spray nozzles 32 which direct the liquid into the meal that is being moved upwardly toward the discharge end of the cooker. Since the stickwater in conduit 73 has a very low fat content, in the neighborhood of 0.03–0.06%, it is a very effective medium for stripping fat from the meal. Further, the insulation of the vessels is such that the stickwater is at substantially the same temperature as the material in the cooker 14. Accordingly, the stickwater acts as a heating agent and as a fat-stripping agent and, by the time the meal reaches the upper end of the cooker and is discharged through the valve 22, it has a moisture content of from about 40 to 50 percent. It is also to be noted that after the meal leaves the pool of cooking material it travels a distance of several feet before it reaches the discharge outlet 20. During this time the sticky liquid in which it was cooked is drained out of the meal. As a result of this draining and the action of the steam that is directed down into the meal, the meal is relatively free of sticky material and can be dried easily.

Immediately below the decanter 52, a branch conduit 76 projects laterally from discharge conduit 72 and is arranged to conduct stickwater to a surge tank 77 in which is provided with a discharge conduit 78. A valve 80 in branch conduit 76 is controlled by an interface control unit 81 which is described in the above-mentioned Hirahara application and is effective to open the valve 80 when the interface between the tallow portion A and the stickwater portion B in the decanter 52 rises. It will be noted that, since the main stickwater discharge conduit 72 delivers the stickwater back to the cooker, the system is substantially a closed system. However, the steam and the material being processed in the cooker continuously bring more moisture into the system and therefore the interface level tends to rise, causing the float in the control unit 81 to move upwardly and actuate a power mechanism to open valve 80 and permit a quantity of stickwater to drain into the surge tank 77. A pump 82 in the discharge line 78 of the surge tank delivers stickwater to a plurality of spray nozzles 83 which direct the liquid onto dry meal that is being conveyed by a screw conveyor 84 toward the discharge end 85a of an open top trough 85. A feature of the present invention resides in the provision of means whereby a portion of the dry meal in storage hopper 48 is dropped into the trough 85 so that it will receive the stickwater sprayed downwardly from the nozzles 83. Since the stickwater is rich in protein, a considerable amount of protein would be lost if the stickwater in the surge tank 77 was discharged. By spraying the stickwater into the dry meal in the recycle conveyor trough 85, the protein is put back into the system. The amount of meal that is recycled through trough 85 and the amount of stickwater discharged through the spray nozzles 83 are so controlled that the moisture content of the dry meal is raised to a point such that when this recycled meal is mixed with the meal in conveyor trough 38, the moisture content of the mixture will be approximately 35 percent and it is this 35 percent mixture that is delivered to the drier. The amount of meal that is recycled can be controlled by regulating the speed of conveyor 84, and the amount of stickwater discharged through nozzles 83 can be controlled by use of a flow control meter and valve arrangement 86 in conduit 78 which would return excess liquid to the tank 77.

When the tallow from the decanter 52 is discharged into the cyclone separator 70, it moves downwardly therein while steam and moist air is discharged from the upper end of the unit. Thus, as the tallow moves downwardly and passes out of the separator 70 through a conduit 86, moisture is removed from the tallow and it comes to rest in a settling tank 87 with a moisture content of about 0.30 percent. From the settling tank 87, the tallow passes through a conduit 88 to a vacuum moisture separator 90. A valve 91 in conduit 88 is opened and closed by a float type control unit 94 which may be of the same type as the interface control unit 81. The conduit 88 extends downwardly into the separator 90 and the tallow discharged therein flows upwardly within a fixed cylinder 92 that is mounted in the separator. The tallow flows over the upper edge of the cylinder 92 and downwardly, in a thin film, along a frusto-conical dome 93. The interior of the separator 90 is evacuated to about 25" of mercury by means of a vacuum pump 95 which draws air through a water cooled condenser 96 and a container 97 that is connected to the inlet of the vacuum pump and is provided with a cloth-like material which further removes liquid from the air. As the tallow, which is at a temperature in the range of from 195–205°

F., moves down the dome 93, liquid is flashed from the tallow and is drawn out of the vacuum chamber by the vacuum pump and is deposited in an accumulator 98. When the tallow leaves the vacuum chamber of separator 90, it has a moisture content of between 0.02 percent and 0.03 percent. A flow valve 99 in a tallow discharge conduit 100 is controlled by a float type control unit 102, which may be of the same type as the interface control unit 81 and is provided with a float 103 which maintains the tallow in the vacuum separator at a predetermined level. A pump (not shown) is connected in the conduit 100 to deliver the tallow to a storage container.

It is to be particularly noted that, from the time the meat scraps enter the continuous pressure cooker 14 until tallow, that has been separated from the meat scraps, leaves the vacuum separator 90, an interval of about 10 to 30 minutes has expired. Thus, due to the very short cooking time, the color of the tallow is exceptionally good and, due to the effective moisture removal steps, the tallow has a very low moisture content.

Protein-enriched low-fat meal can also be produced in accordance with the present invention by eliminating the recycling of dry meal and directing the stickwater from spray nozzles 83 into the low-fat meal in conveyor trough 38. This is an effective method of increasing the protein content of the meal. Due to the fact that the addition of stickwater to the meal raises the liquid content of the relatively wet meal from the cooker, a longer treatment in the drier 40 is necessary for meal produced by this alternate process.

It will be understood that when moisture contents are given in the present specification and claims, the percentage is on a weight basis. Thus, for example, when a meal having a moisture content of 35 percent is indicated, the meal has 35 percent moisture and 65 percent solid material.

It will be understood that while we have illustrated a cooker wherein the fat stripping nozzles 32 are in the uppermost part of the cooker, it is within the scope of the present invention to mount the nozzles intermediate the length of the cooker so that a lower cooking zone, an intermediate fat-stripping or rinse zone, and an upper drain zone is provided in the cooker.

From the foregoing description, it will be evident that the present invention provides a new, efficient method of renderizing fat-containing slaughter house wastes. The use of stickwater to strip fat from meal makes possible the production of meal that has a high protein content and a fat content of only about 7 percent, which is well below the maximum permissible fat content in commercially acceptable meal. The recycling of dry meal so that excess stickwater can be added thereto increases the efficiency of the operation since valuable protein is saved by this operation. Also, the use of a cyclone separator and a vacuum moisture stripper in series provides a drying action that effectively removes moisture from the tallow and produces a tallow that is clear and substantially free from moisture.

While a particular embodiment of the present invention has been shown and described, it will be understood that the renderizing method and apparatus of the present invention is capable of modification and variation without departing from the principles of the invention, and that the scope of the invention should be limited only by the scope and proper interpretation of the claims appended hereto.

Having thus described our invention, what we claim as new and desire to protect by Letters Patent is:

1. In a process of rendering animal fats or other fat-containing solids, the steps of cooking animal material in a confined steam atmosphere under pressure to cause the material to separate into meal, fat and proteinaceous liquid; separating the meal, fat and liquid from each other to provide tallow, low fat meal and concentrated proteinaceous liquid; directing a portion of said liquid into said meal to obtain protein-enriched low-fat meal; and heating said meal to reduce its moisture content.

2. In a process of rendering animal fats or other fat-containing solids, the steps of cooking animal material in a confined steam atmosphere under pressure to cause the separation of the material into meal, fat, and proteinaceous extract; separating the meal, fat and extract from each other; directing a portion of the extract into and through the separated meal to strip fat from the meal and provide relatively low fat meal; adding protein-enriched meal to said low fat meal to form a mixture of the meals having a relatively high protein content; and drying said mixture to reduce its liquid content.

3. In a process of rendering animal fats or other fat-containing solids, the steps of continuously subjecting animal material containing fats to a confined pressurized steam atmosphere to form a pool of solid material, fat and stickwater; continuously conveying from the pool a body of solid material having entrained fat and removing said material from said atmosphere; continuously removing fat and stickwater from the pool and separating them from each other; separating the stickwater into two streams; continuously directing the stickwater from one stream into and through the body of solid material while still within said confined atmosphere to strip fat therefrom and produce low-fat material; and continuously directing the stickwater from the other stream into the solid material that is outside of said confined pressurized steam atmosphere whereby all of the stickwater produced is either added to the material outside of said confined atmosphere to add protein thereto or is recirculated to strip fat from the solid material.

4. In a process for rendering animal fats or other fat-containing solids, the steps of subjecting animal material containing fats to a confined pressurized steam atmosphere to form a pool of solid material, fat and stickwater; conveying from the pool a body of solid material having entrained fat; removing fat and stickwater from the pool and separating them from each other; and directing a portion of the stickwater into and through the body of solid material to strip entrained fat therefrom and provide low-fat protein-enriched meal.

5. In a process for rendering animal fats or other fat-containing solids, the steps of subjecting animal material containing fats to a confined pressurized steam atmosphere to form a pool of solid material, fat and stickwater; conveying from the pool a body of fat-containing solid material; removing fat and stickwater from the pool and separating them from each other; moving said body of fat-containing material along a predetermined path; heating a first portion of said material to reduce its moisture content; collecting the dried material; directing a portion of the stickwater into said dried material to increase the protein content of the material; directing the protein-enriched material into a second portion of the material being moved along said predetermined path to form a mixture of the low fat material and protein-enriched material; and heating said mixture to reduce its moisture content.

6. In a process of rendering animal fats or other fat-containing solids, the steps of cooking animal material in a confined steam atmosphere under pressure to cause the material to separate into meal, fat and proteinaceous liquid; separating the meal, fat and liquid from each other to provide tallow, meal and concentrated proteinaceous liquid and moving the meal along a predetermined path, directing a portion of said liquid into said meal at a first portion of said path to strip fat therefrom; subsequently directing another portion of said liquid into the meal at a subsequent portion of said path to further increase the protein content; and heating said meal to reduce the moisture content.

7. In a process of rendering animal fats or other fat-containing solids, the steps of cooking animal material containing fats in a confined steam atmosphere under pressure to cause the meal to separate into a pool of meal and a mixture containing fat and stickwater; removing the meal from said pool; removing said mixture from the pool; separating the fat in the liquid from the stickwater under the same conditions of steam pressure as those under which the material was cooked; directing a portion of said stickwater into the meal in said confined atmosphere; directing another portion of said stickwater into the meal removed from said atmosphere to add protein thereto; separately removing moisture from said fat and from said protein-enriched meal; and separately collecting low-moisture fat and high-protein meal.

8. In a process of rendering animal fats or other fat-containing solids, the steps of cooking animal material in a confined steam atmosphere under pressure to cause the separation of the material into meal, fat, and proteinaceous extract; separating the meal, fat and extract from each other; directing a portion of the extract into and through the separated meal to strip fat from the meal and provide relatively low fat meal; adding protein-enriched meal to said low fat meal to form a mixture of the meals having a moisture content of approximately 35% and having a relatively high protein content; and drying said mixture to reduce its liquid content.

9. In a process of rendering animal fats or other fat-containing solids, the steps of cooking animal material containing fats in a steam atmosphere under a pressure in the range of 50–120 p.s.i.g. to cause the meal to separate into a pool of meal and a mixture containing fat and stickwater; removing the meal from said pool; removing said mixture from the pool; separating the fat in the liquid from the stickwater in a steam atmosphere under a pressure in the range of 50–120 p.s.i.g.; directing a portion of said stickwater into the meal in said confined atmosphere; directing another portion of said stickwater into the meal removed from said atmosphere to add protein thereto; separately removing moisture from said fat and from said protein-enriched meal; and separately collecting low-moisture fat and high-protein meal.

10. In a process of rendering animal fats or other fat-containing solids, the steps of cooking animal material in a confined steam atmosphere at a pressure of from 50 to 120 p.s.i.g. to cause the separation of the material into meal, fat, and proteinaceous extract; separating the meal, fat and extract from each other; directing a portion of the extract into and through the separated meal to strip fat from the meal and provide relatively low fat meal; adding protein-enriched meal to said low fat meal to form a mixture of the meals having a moisture content of approximately 35% and having a relatively high protain content; and drying said mixture to reduce its liquid content.

11. In a process for rendering animal fats, or other fat-containing solids, the steps of continuously subjecting animal material containing fats to a confined pressurized steam atmosphere to raise the temperature of the material to the range of 300–350° F. to form a pool of solid material, fat and stickwater; continuously conveying from the pool a body of solid material having entrained fat; continuously removing fat and stickwater from the pool and separating them from each other; continuously directing a portion of the stickwater into and through the body of solid material to strip entrained fat therefrom and provide low-fat protein-enriched meal; and continuously removing moisture from the fat removed from said pool.

12. In a continuous process of rendering animal fats or other fat-containing solids and the like, the steps of continuously supplying animal material to a confined steam atmosphere at a pressure in the range of 50–120 p.s.i.g. under pressure to cause the material to separate into meal, fat and proteinaceous liquid; continuously withdrawing the meal, fat and liquid from said confined atmosphere and separating them from each other to provide tallow, low fat meal and concentrated proteinaceous liquid; continuously directing a portion of said liquid into said meal to obtain protein-enriched low-fat meal; and heating said meal to reduce its moisture content.

13. In a system for rendering inedible animal fats the combination of a processing vessel having a cooking zone and a drain zone, means for maintaining a pressurized steam atmosphere in said vessel whereby animal fats confined in the cooking zone of said vessel separate into solid material, fat and stickwater, means for conveying a body of solid material out of said cooking zone and along said drain zone, means for removing fat and stickwater from said cooking zone and separating the fat from the stickwater, and means for directing a portion of the stickwater into and through the solid material in the drain zone of said vessel to strip fat therefrom and produce low-fat solid material.

14. In a system for rendering inedible animal fats the combination of a processing vessel having a cooking zone and a drain zone, means for maintaining a pressurized steam atmosphere in said vessel whereby animal fats confined in the cooking zone of said vessel separate into solid material, fat and proteinaceous stickwater, means for continuously conveying solid material out of said vessel and along a predetermined path, means for removing fat and stickwater from said cooking zone and separating the fat from the stickwater, means for directing a portion of the stickwater into and through the solid material moving along said path to add protein thereto; and means for drying said protein-enriched material.

15. A system for rendering inedible animal fats comprising a processing vessel having a cooking zone and a drain zone, means for maintaining a pressurized steam atmosphere in said vessel whereby animal fats confined in the cooking zone of said vessel separate into solid material, fat and protein-rich stickwater, means for continuously conveying solid material out of said vessel and along a predetermined path, means for removing fat and stickwater from said cooking zone and separating the fat from the stickwater, a drier arranged to receive the solid material moving along said path and reduce the moisture content thereof, means for directing stickwater into a portion of the material dried in said drier, and means for mixing the protein-enriched material with material moving along said path toward said drier.

16. A system for rendering inedible animal fats comprising a processing vessel having a cooking zone and a drain zone, means for maintaining a pressurized steam atmosphere in said vessel whereby animal fats confined in the cooking zone of said vessel separate into solid material, fat and protein-rich stickwater, means for conveying a body of solid material out of said cooking zone and along said drain zone, means for removing fat and stickwater from said cooking zone and separating the fat from the stickwater, means for directing a portion of the stickwater into and through the solid material in the drain zone of said vessel to strip fat therefrom and produce low-fat solid material, means for removing said low-fat solid material from said vessel and conveying it along a predetermined path, means for adding stickwater to said material as it moves along said path to add protein thereto, and means for drying said material to produce low-fat high-protein material.

17. In a system for rendering animal fats or other fat-containing solids, the combination of a processing vessel, means for maintaining a pressurized steam atmosphere in said vessel, means for delivering animal material containing fats to said vessel whereby said material is separated into solid material and a mixture of fats and proteinaceous liquid, means for continuously removing solid material from said vessel, a drier for drying the material, a conveyor positioned to receive dried material and carry it away from said drier, means for removing the mixture of fats and liquid from said vessel, means for separating the fat from the liquid, a cyclone moisture stripper arranged to receive the separated fat and reduce the moisture content to approximately 0.30%, and a vacuum moisture stripper arranged to receive the fat from said cyclone and reduce the moisture content to approximately 0.03%.

18. In a system for rendering animal fats or other fat-containing solids, the combination of a generally cylindrical processing vessel adapted to be mounted in an upwardly inclined position to define a lower cooking zone and an upper drain zone, means for maintaining an atmosphere of steam under pressure in said vessel, pressure value means for delivering animal fats to said vessel to be processed in said cooking zone and separated into solid material, fat and stickwater, said cylindrical vessel having a generally circular end member at its lower end provided with a discharge aperture adjacent the upper peripheral edge thereof, a conveying screw journalled for rotation in said vessel, a disc secured to the lower end of said screw adjacent said aperture the upper peripheral edge of said disc cooperating with the inner surface of said vessel to define a restricted orifice through which material must pass before entering said discharge aperture, and means for rotating said screw to convey solid material upwardly away from the cooking zone and cause material in front of said restricted orifice to be moved downwardly in said vessel.

19. A system for rendering inedible animal fats comprising a processing vessel having a cooking zone and a drain zone, means for maintaining a pressurized steam atmosphere in said vessel whereby animal fats confined in the cooking zone of said vessel separate into solid material, fat and stickwater, means for continuously conveying a body of solid material out of said cooking zone and along said drain zone, means for removing fat and stickwater from said cooking zone and separating the fat from the stickwater, a means for removing moisture from said fat, a pair of conduits adapted to receive stickwater that was separated from fat, means for directing stickwater from one of said conduits into and through the solid material moving along said drain zone, means for continuously removing solid material from said drain zone and directing it along a predetermined path, a drier adapted to receive material from said path and reduce the moisture content thereof, a storage hopper, conveying means for delivering material from said drier to said hopper, a conveyor adapted to receive dried material from said hopper and mix it with material moving along said predetermined path, and means for directing stickwater from the other of said conduits into dried material on said conveyor.

20. A rendering system comprising a generally cylindrical processing vessel mounted in an inclined position at about 10° to the horizontal and having an interior divided into a lower cooking zone and an upper drain zone, means for continuously depositing animal material containing fat in said vessel, means for maintaining a steam atmosphere in said vessel at a pressure in the range of 50-120 p.s.i.g. whereby the temperature of material deposited in said vessel will be raised to a temperature in the range of from 300-350° F. and will be cooked to separate the material into meal and a mixture of fats and stickwater, a hollow tubular screw journalled for rotation in said vessel and arranged to continuously move meal from said cooking zone and carry it along said drain zone, said vessel having a lower end portion with a discharge aperture therein disposed substantially at the upper level of material in said cooking zone and adapted to receive the mixture of fats and stickwater draining from said cooking zone, means adjacent said discharge aperture for filtering solids from the mixture moving toward said aperture, a decanter adapted to receive the mixture draining from said vessel, conduit means connecting the interior of said container with the interior of said vessel whereby fat and stickwater will separate in said container due to their difference in densities under substantially the same conditions as are maintained in said vessel, means for receiving fat from said decanter and reducing the moisture content to approximately 0.03%, a first conduit for delivering stickwater from the decanter to the interior of said tubular screw, spray means for directing the stickwater from said screw onto meal being moved along said drain zone to strip fat therefrom, a first conveyor for receiving meal from said vessel and conveying it along a predetermined path, a drier adapted to receive meal from said conveying means and reduce its moisture content to approximately 8%, a storage hopper, means for transferring meal from said drier to said hopper, a second conveyor arranged to receive dry meal from said storage hopper and discharge it onto meal being advanced on said first conveyor, conduit means for directing stickwater removed from said decanter onto the dry meal in said second conveyor to add protein thereto, the amount of stickwater added to said meal being such that the moisture content of the mixture of low-fat meal from said cooking vessel and the protein-enriched meal is approximately 35% as it is discharged from said first conveyor to said drier.

21. In a process for separating animal fats from proteinous matter, the steps of heating stickwater to at least 300 degrees F. at a pressure of at least 50 p.s.i., directing said heated stickwater into solid proteinous matter carrying animal fat to remove the fat from the proteinous matter, collecting the resultant fat-stickwater dispersion, and separating said dispersion into a stickwater portion and a fatty liquid portion.

22. In a process for separating fats from proteinous matter wherein the solid proteinous matter is moved through a pool of fatty material incident to treatment thereof in a processing vessel, the improvement which comprises the steps of directing heated stickwater into said proteinous matter after it leaves the pool to strip fatty material from the proteinous matter, and returning the fatty material back to the pool.

References Cited by the Examiner
UNITED STATES PATENTS

| | | | |
|---|---|---|---|
| 541,187 | 6/1895 | Stanley | 23—280 |
| 664,720 | 12/1900 | Brown | 23—280 |
| 2,679,457 | 5/1954 | Shaw | 99—7 |
| 2,708,630 | 5/1955 | Davis | 99—7 |

A. LOUIS MONACELL, *Primary Examiner.*

B. H. STRIZAK, S. J. BAICKER, A. E. TANENHOLTZ,
*Assistant Examiners.*